(12) United States Patent
Smith et al.

(10) Patent No.: US 6,485,805 B1
(45) Date of Patent: *Nov. 26, 2002

(54) MULTILAYER INSULATION COMPOSITE

(75) Inventors: Douglas Michael Smith, Albuquerque, NM (US); R. Ulrich Boes, Neu Isenberg (DE); Alok Maskara, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/007,839

(22) Filed: Jan. 15, 1998

(51) Int. Cl.$^7$ ............... C04B 35/14; F16L 59/02; F16L 59/08

(52) U.S. Cl. ............... 428/36.5; 252/62; 428/117; 428/331; 428/469; 428/472

(58) Field of Search ............... 428/34.1, 117, 428/331, 469, 472, 36.5; 252/62

(56) References Cited

U.S. PATENT DOCUMENTS

| | | | | |
|---|---|---|---|---|
| 3,122,520 A | * | 2/1964 | Lentz | 260/46.5 |
| 3,152,033 A | | 10/1964 | Black | 161/50 |
| 3,302,358 A | | 2/1967 | Jackson | 52/573 |
| 3,799,056 A | | 3/1974 | Colignon | 102/105 |
| 3,812,886 A | | 5/1974 | Hollblood | 138/149 |
| 4,284,674 A | | 8/1981 | Sheptak | 428/69 |
| 4,303,729 A | * | 12/1981 | Torobin | 428/327 |
| 4,323,620 A | | 4/1982 | Iwabuchi | 428/215 |
| 4,359,496 A | | 11/1982 | Kratel | 428/75 |
| 4,374,687 A | | 2/1983 | Yamamoto | 156/71 |
| 4,375,493 A | | 3/1983 | George | 428/27 |
| 4,381,716 A | | 5/1983 | Hastings | 109/2 |
| 4,444,821 A | | 4/1984 | Young | 428/69 |
| 4,447,345 A | * | 5/1984 | Kummermehr et al. | 252/62 |
| 4,460,645 A | * | 7/1984 | Jones et al. | 428/323 |
| 4,468,423 A | * | 8/1984 | Hall | 428/72 |
| 4,726,974 A | | 2/1988 | Nowobilski | 428/69 |
| 4,745,015 A | | 5/1988 | Cheng | 428/35 |
| 4,877,689 A | | 10/1989 | Onstott | 428/607 |
| 5,018,328 A | | 5/1991 | Cur | 50/406 |
| 5,030,518 A | | 7/1991 | Keller | 428/550 |
| 5,038,693 A | | 8/1991 | Kourtides | 112/440 |
| 5,080,306 A | | 1/1992 | Porter | 244/158 A |
| 5,084,313 A | * | 1/1992 | Missig et al. | 428/35.8 |
| 5,143,770 A | | 9/1992 | Gonczy | 428/78 |
| 5,175,975 A | | 1/1993 | Benson | 52/791 |
| 5,178,921 A | | 1/1993 | Whelan | 428/34.5 |
| 5,224,832 A | | 7/1993 | Gonczy | 112/262.1 |
| 5,252,408 A | | 10/1993 | Bridges | 428/621 |

(List continued on next page.)

FOREIGN PATENT DOCUMENTS

| | | | | |
|---|---|---|---|---|
| EP | 0 526 363 A2 | * | 2/1963 | B32B/3/12 |
| EP | 0 119 331 A1 | * | 9/1984 | G02B/1/10 |
| GB | 1 001 683 A | * | 8/1965 | |

OTHER PUBLICATIONS

Perry et al (ed.), Chemical Engineer's Handbook, 6th ed., (1984), pp 12–55 through 12–58.*
PCT International Search Report for International Apppplication No. PCT/US99/00164, International Filing Date of Jan. 13, 1999.*
Perry, Robert H. & Don W. Green (ed.), "Storage Systems," Chemical Engineer's Handbook 6$^{th}$ Ediiton, 12–55–12–58 (1984).

*Primary Examiner*—Sandra M. Nolan
(74) *Attorney, Agent, or Firm*—Tim A. Cheatham

(57) ABSTRACT

The present invention is an insulating composite comprising (a) a first thermally reflective layer having a reflective surface and an opposing surface and (b) silica aerogel granules. The present invention further includes an insulating element in which the insulating composite is disposed within an air-impermeable container.

15 Claims, 3 Drawing Sheets

U.S. PATENT DOCUMENTS

| | | | |
|---|---|---|---|
| 5,256,858 A | 10/1993 | Tomb | 219/213 |
| 5,271,980 A | 12/1993 | Bell | 428/68 |
| 5,277,959 A | 1/1994 | Kourtides | 428/116 |
| 5,304,408 A | 4/1994 | Jarosz | 428/75 |
| 5,376,424 A | 12/1994 | Watanabe | 428/69 |
| 5,386,706 A * | 2/1995 | Bergsten et al. | 62/45.1 |
| 5,500,305 A | 3/1996 | Bridges | 428/621 |
| 5,508,106 A | 4/1996 | Yoshino | 428/323 |
| 5,549,956 A | 8/1996 | Handwerker | 428/73 |
| 5,877,100 A * | 3/1999 | Smith et al. | 501/12 |
| 5,948,314 A * | 9/1999 | Geiss et al. | 252/62 |
| 6,010,762 A * | 1/2000 | Smith et al. | 428/69 |

\* cited by examiner

MULTILAYER INSULATION COMPOSITE

TECHNICAL FIELD OF THE INVENTION

The present invention relates to a multilayer insulation composite and, more particularly, a multilayer insulation composite containing silica aerogel granules.

BACKGROUND OF THE INVENTION

A common type of insulation used for cryogenic applications is multilayer insulation. Multilayer insulations typically consist of alternating layers of highly reflecting material, such as aluminum foil or aluminized mylar, and a low-conductivity spacer material or insulator, such as fiberglass mat or paper, glass fabric, or nylon net. Between twenty and forty such layers are commonly used for cryogenic applications including, for example, laboratory dewars, piping, on-site storage vessels, and tank trucks. In addition, multilayer insulations are advantageously kept under a high vacuum, thereby further enhancing the insulating properties of the multilayer insulations. Multilayer insulations have a very low thermal conductivity due to the fact that all modes of heat transfer—conductive, convective, and radiative—are minimized. The multiple layers of reflecting material have a low emissivity and, thereby, inhibit radiative heat transfer. Convective heat transfer is inhibited by lowering the pressure (i.e., creating a vacuum) between the insulation layers. Finally, the presence of spacer material inhibits conductive heat transfer through thermal short-circuits that might otherwise exist between the layers of reflecting material.

Current multilayer insulations, however, are disadvantageous due to the need for complex vacuum pumping equipment to maintain the insulation in a highly evacuated environment. Typical multilayer insulations require vacuum levels on the order of $10^{-7}$ to $10^{-5}$ kPa ($10^{-6}$ to $10^{-4}$ torr) to achieve suitable thermal performance. To sustain this low vacuum level, time consuming and expensive pumping and heating cycles are required as well as the addition of hydrogen and water getters/adsorbers. For some cryogenic applications, it would be advantageous to obtain similar thermal performance from the multilayer insulation at higher pressures in order to reduce costs associated with obtaining a vacuum.

Therefore, it is an object of this invention to provide a multilayer insulation composite which exhibit satisfactory thermal performance in cryogenic applications under higher pressures. It is another object of this invention to provide a multilayer insulation composite which exhibits improved thermal performance in cryogenic applications at low vacuum levels. These and other objects and advantages of the present invention, as well as additional inventive features, will be apparent from the description of the invention provided herein.

BRIEF SUMMARY OF THE INVENTION

The present invention is an insulating composite comprising (a) a first thermally reflective layer having a reflective surface and an opposing surface and (b) silica aerogel granules. The present invention further includes an insulating element in which the insulating composite is disposed within an air-impermeable container.

DESCRIPTION OF THE PREFERRED EMBODIMENTS

Figure 1:
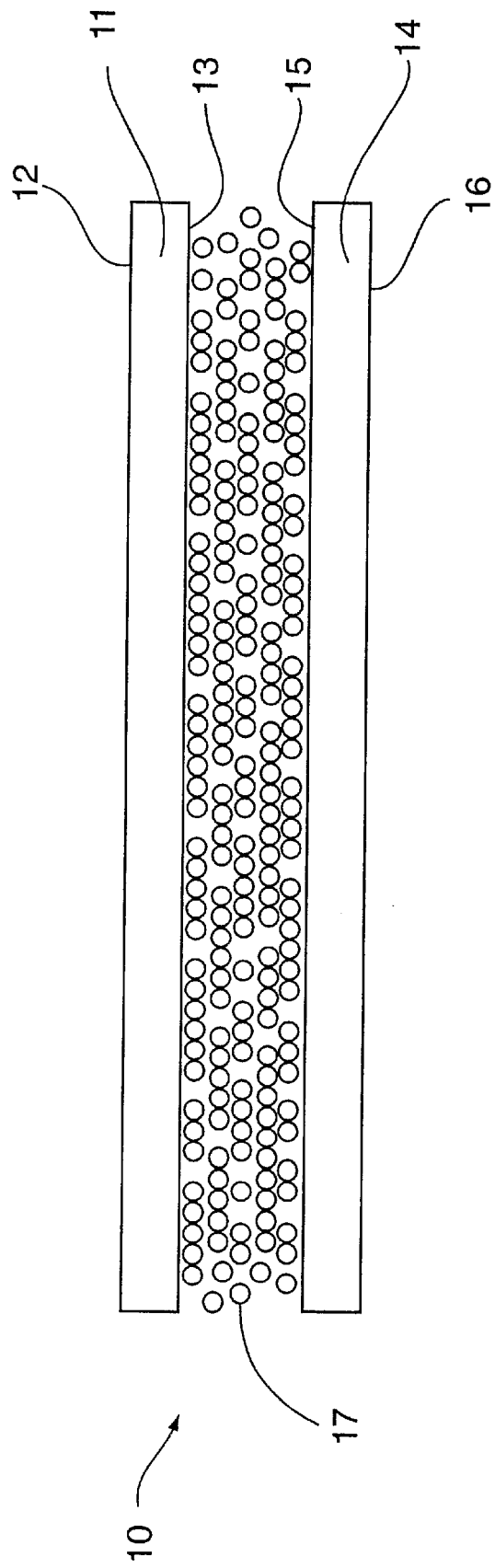
FIG. 1 is a schematic cross-sectional side view of an illustrative insulating composite having first and second thermally reflective layers and silica aerogel granules therebetween in accordance with the present invention.

The present invention provides an insulating composite having a thermally reflective layer and silica aerogel granules.

Any material that is effective in inhibiting radiative heat transfer can be used as the thermally reflective layer. Typically, such materials will have a polished or reflective surface. Also, the thermally reflective material typically will be in the form of a sheet or strip. Thus, the thermally reflective layer generally will have a reflective surface and an opposing surface. Suitable thermally reflective layers include, for example, aluminum foil and aluminized mylar. Other suitable thermally reflective layers include polyester, polyamide, polyimide, or polyolefin films having aluminum deposited on one or both surfaces of the film. Such thermally reflective polyester film is commercially available as aluminized mylar film. Other thermally reflective materials having a low emissivity, such as gold and silver, can be deposited instead of aluminum on the aforementioned substrates in certain applications. Preferably, the thermally reflective layer is a thin aluminum foil which is polished on one side. The thermally reflective layer can have any suitable thickness, preferably about 10–100 μm.

Any suitable silica aerogel granules can be used in the insulating composites of the present invention. The term "gel" refers to a coherent, rigid, continuous three-dimensional network of colloidal particles. Gels are produced by the aggregation of colloidal particles (typically under acidic conditions when neutralizing salts are absent) to form a three dimensional gel microstructure. When a gel is dried (liquid removed from the pores) by means in which the coherent gel microstructure is preserved, such as by supercritical drying, a low density "aerogel" is formed. One suitable process for the production of silica aerogels is described in U.S. Pat. No. 3,122,520 (Lentz). Silica aerogels have highly desirable properties such as, for example, optical transparency, extremely low density, and very low thermal conductivity. Because of its low thermal conductivity, silica aerogels are advantageously utilized in the insulating composites discussed herein. The silica aerogel granules can have any suitable diameter, preferably about 50–500 μm. In addition, the silica aerogel granules can have any suitable density, preferably about 0.05–0.15 g/cm$^3$, and/or surface area, preferably at least about 200 m$^2$/g. The surface area is calculated based on the amount of nitrogen adsorbed at five different relative pressures over the range 0.05 to 0.25 according to the Brunauer-Emmett-Teller (BET) model, which is referenced in Gregg, S. J. and Sing, K. S. W, "Adsorption, Surface Area and Porosity," p. 285, Academic Press, New York (1991).

The insulating composite of the present invention can further include additional thermally reflective layers, e.g., second, third, fourth, etc. thermally reflective layers. The above discussion of the "first" thermally reflective layer is equally applicable to these additional (e.g., "second," "third," "fourth," etc.) thermally reflective layers. The additional thermally reflective layers can be constructed of the same or different material, and in the same or different manner, as the first thermally reflective layer. In a preferred embodiment, all of the thermally reflective layers (e.g., the first and second thermally reflective layers) are aluminum foil.

In one embodiment of the present invention, the insulating composite comprises a first thermally reflective layer and silica aerogel granules. The opposing surface of the first thermally reflective layer preferably is adjacent to the silica aerogel granules.

In another embodiment, the insulating composite comprises two or more thermally reflective layers and silica aerogel granules. The silica aerogel granules preferably are positioned between the thermally reflective layers. In this embodiment, the opposing surface of the first thermally reflective layer and the reflective surface of the second and subsequent thermally reflective layers preferably are adjacent to the silica aerogel granules.

The present invention is further described with reference to the accompanying drawings.

In FIG. 1, an insulating composite 10 is shown having a first thermally reflective layer 11 with a reflective surface 12 and an opposing surface 13 and a second thermally reflective layer 14 having a reflective surface 15 and an opposing surface 16. Aerogel granules 17 are located between the first thermally reflective layer 11 and the second thermally reflective layer 14. In this embodiment, the reflective surface 15 of the second thermally reflective layer 14 and the opposing surface 13 of the first thermally reflective layer 11 are adjacent to the aerogel granules 17.

The aerogel granules in the present invention can be either loosely held in place by one or more thermally reflective layers of the insulating composite or adhered to the thermally reflective layers. Preferably, the aerogel granules are adhered to the opposing surface of a thermally reflective layer.

The aerogel granules can be adhered to the surface of a thermally reflective layer by any suitable means. Preferably, a binder adheres the aerogel granules to the thermally reflective layer. A wide range of binders are suitable to adhere the aerogel granules. Inorganic binders are preferred, particularly sodium silicate. In adhering the aerogel granules, the binder is applied to one of the surfaces of the thermally reflective layer (preferably the opposing surface thereof), and aerogel granules are subsequently placed in contact with the binder. Alternatively, the aerogel granules and binder are mixed and then coated on the surface of the thermally reflective layer. The coating of the aerogel granules/binder mixture can be conducted using any suitable coating technique.

The thermal performance of the insulating composite of the present invention can be tailored over a wide range depending upon the extent of aerogel coverage. For example, if one desires to obtain advantageous thermal performance at higher pressures (e.g., above about $10^{-3}$ kPa or about $10^{-2}$ torr), the aerogel granules cover preferably at least about 50% of the surface area of a surface of the thermally reflective layer, more preferably at least about 90% of the surface area of a surface of a thermally reflective layer, and most preferably all or substantially all of the surface area of a surface of a thermally reflective layer. For better thermal performance at lower pressures (e.g., below about $10^{-3}$ kPa or about $10^{-2}$ torr), the aerogel granules cover a smaller fraction of the surface area of the thermally reflective layer. Thus, at lower pressures (e.g., below about $10^{-3}$ kPa or about $10^{-2}$ torr), preferably less than about 50% of the surface area of one of the surfaces of a thermally reflective layer is covered with aerogel granules. More preferably, aerogel granules cover at least about 20% of the surface area of a surface of a thermally reflective layer at lower pressures and, most preferably, at least about 10% of the surface area of a surface of a thermally reflective layer.

Other additives can be present in the insulating composite of the present invention. For example, hydrogen and water getters can be used. As with the silica aerogel granules, these additional components can be either loosely present in the insulating composite between one or more thermally reflective layers or adhered to one or more thermally reflective layers. One suitable method of incorporating such additives into the inventive insulating composite is to mix the additives with the silica aerogel granule/binder feed to a suitable coating machine which then applies the composition to the surface of one or more thermally reflective layers.

In order to facilitate the binding together of the layers and/or to provide a measure of protection to the thermally reflective layers, outer or cover layers can be used in conjunction with the present inventive insulating composite, e.g., placed on the surfaces of opposite sides of the insulating composite. Such cover layers are optional.

An insulating composite having a single thermally reflective layer or multiple thermally reflective layers can be used to insulate various items. The insulating composite of the present invention can be applied directly to the surface for which insulation is desired. For example, the insulating composite can be placed directly on the outer surface of dewars, piping, storage tanks, and tank trucks. Multiple sheets of strips of insulating composite having a single thermally reflective layer can be applied to produce a multilayer insulating composite. Alternatively, sheets or strips of the inventive insulating composite can be wrapped around the surface to be insulated, such as pipes or tanks. Separate individual sheets or strips can be used to wrap surfaces or one continuous sheet or strip can be wound around surfaces such that the insulating composite has a spiral-shaped configuration.

Alternatively, the insulating composite can be placed in a suitable container, preferably an air-impermeable container, to form an insulating element. The insulating element containing the insulating composite is applied to the outer surface of the particular item requiring insulation. The container also can have suitable dimensions to contain both the insulating composite and the item requiring insulation itself.

Depending upon the particular application, the reflective surface of the thermally reflective layer can face toward or away from the surface to be insulated. In multilayer insulating composites having more than one thermally reflective layer, all of the reflective surfaces preferably face the same direction. In applications where it is desired to keep a surface at a cooler temperature than the surrounding environment (e.g., cryogenic applications), the reflective surfaces preferably face away from the cooler surface. This configuration minimizes radiative heat transfer from the warmer environment to the cooler surface. Alternatively, in applications where it is desired to keep a surface at a warmer temperature than the surrounding environment (e.g., process piping for hot fluids), the reflective surface preferably face toward the warmer surface. This configuration minimizes radiative heat transfer from the warmer surface to the cooler environment.

The use of an air-impermeable container permits the insulating composite disposed within to be subjected to a pressure below atmospheric pressure which results in the reduction of heat transfer by conduction. The lower pressure is attained by establishing a vacuum within the air-impermeable container which can be done using conventional vacuum equipment. The pressure within the air-impermeable container can be about 10 kPa (100 torr) or less, preferably about 0.1 kPa (1 torr) or less, and most preferably about $10^{-3}$ kPa ($10^{-2}$ torr) or less.

Figure 2:
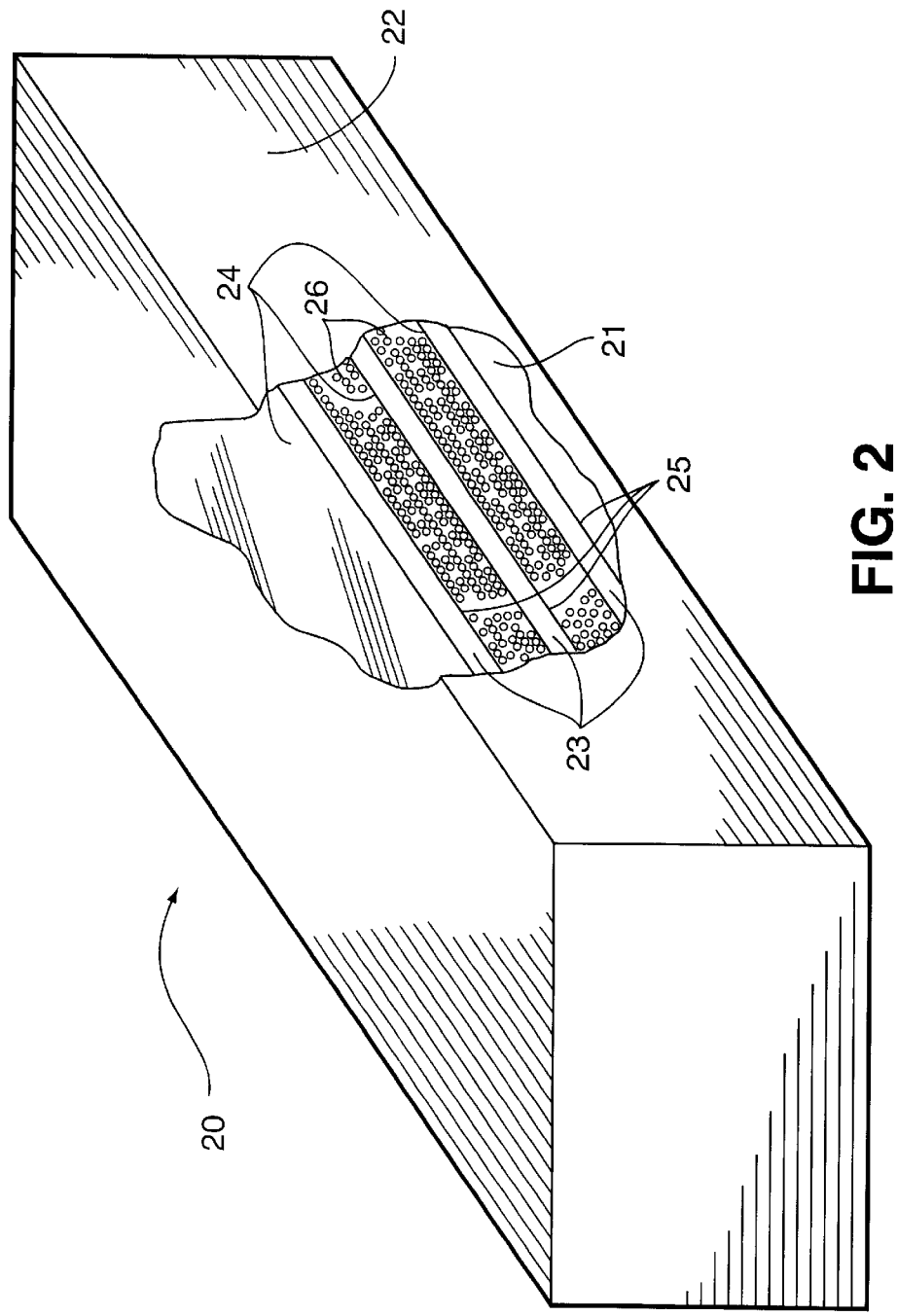
FIG. 2 is an schematic cross-sectional side view of an illustrative insulating element comprising an impermeable container and a multilayer insulating composite in accordance with the present invention.

The insulating composite of the present invention as disposed within a container to form an insulating element is shown in FIG. 2. The insulating element 20 comprises a multilayer insulating composite within the interior cavity 21 of an air-impermeable container 22. The multilayer insulating composite comprises successive layers of a thermally reflective material 23 having a reflective surface 24 and an opposing surface 25. The layers of thermally reflective material 23 are separated by silica aerogel granules 26. The spacing between the thermally reflective layers 23 is fixed by the diameter and quantity of aerogel granules. Because radiant-heat transfer is inversely proportional to the number of thermally reflective layers and directly proportional to the emissivity of these layers, radiation is minimized by using multiple layers of a low-emissivity thermally reflective material.

The insulating composite and insulating element of the present invention are suitable for use as insulators in a wide variety of applications over a wide variety of temperatures. For example, the inventive insulating composite can be used for cryogenic applications such as laboratory dewars, process piping, storage vessels, and tank trucks. Additionally, the insulating composites disclosed herein can be used in superconducting magnet applications as disclosed in U.S. Pat. No. 5,143,770. In addition to cryogenic applications, insulating composites and insulating elements of the present invention can be used in extremely high temperature applications such as, for example, aerospace vehicles, firemen's suits, and industrial tools.

The following example further illustrates the present invention but, of course, should not be construed as in any way limiting its scope.

EXAMPLE

This example illustrates the superior insulating capabilities of the present inventive insulating composite as compared to a conventional insulating composite.

Three different insulating composites are prepared using a first thermally reflective layer comprising aluminum foil and a spacer material. The three insulating composites are referred to as follows: (1) foil/fiber paper, (2) foil/silica aerogel granules (high coverage), and (3) foil/silica aerogel granules (low coverage). The thermally reflective layer in these three insulating composites is identical (e.g., identical material and thickness). The only difference between the three structures is the spacer material. In the first composite, a fiber paper material is used. In the second and third composites, silica aerogel granules having a 500 μm diameter and a density of 0.1 g/cm$^3$ are used. The silica aerogel granules in the high coverage model cover 100% of the opposing surface of the foil layer. The silica aerogel granules in the low coverage model cover 10% of the opposing surface of the foil layer.

Figure 3:
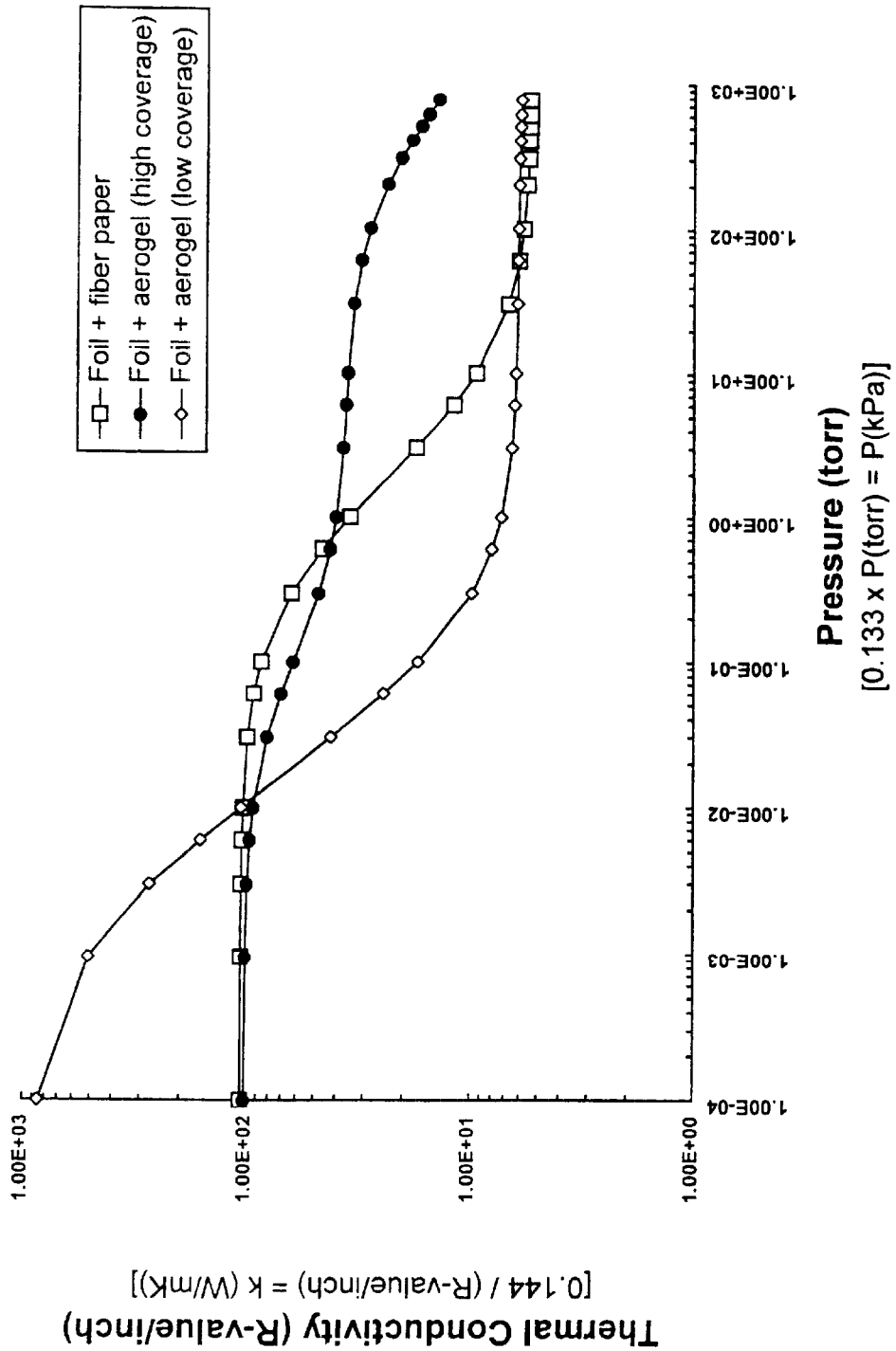
FIG. 3 is a graph illustrating the thermal performance of conventional foil-fiber paper and the present inventive foil-aerogel multilayer insulation composites at ambient temperature wherein the thermal conductivity k (W/mK) and R-value/inch is plotted against pressure.

The predicted thermal performances for these three insulating composites were determined for a variety of pressures ranging from a good vacuum to atmospheric pressure using computer modeling. See Fricke et al., *Int. J. Heat Mass Transfer,* 35, 2305 (1992); Hrubesh and Pekala, *J. Mater. Res.,* 9, 731 (1994), Zeng et al., *J. Non-Cryst. Solids,* 186, 264 (1995). The thermal conductivities for these three insulating composites are plotted in FIG. 3. Specifically, this figure plots the predicted change in thermal conductivity k (W/mK) and R-value/inch as a function of pressure for ambient temperature performance. The thermal conductivity k (W/mK) and R-value/inch is plotted along with Y-axis, while pressure is plotted along the X-axis.

From this graph of predicted thermal performance, the foil/silica aerogel granules (low coverage) insulating composite exhibits better thermal performance than the other two insulating composites at pressures below about $10^{-3}$ kPa ($10^{-2}$ torr). The foil/silica aerogel granules (high coverage) insulating composite exhibits a thermal performance roughly similar to the thermal performance of the foil/fiber paper insulating composite at pressures between about $10^{-3}$ kPa ($10^{-2}$ torr) and about 0.1 kPa (0.8 torr). The foil/silica aerogel granules (high coverage) insulating composite exhibits superior thermal performance as compared to the other two insulating composites at pressures above about 0.1 kPa (0.8 torr).

Thus, various embodiments of the present inventive insulating composite are expected to exhibit thermal performances which are superior to that of equivalent conventional insulating composites in a wide range of environments.

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A multiple layer insulating composite comprising
   (a) at least a first and a second thermally reflective layer having a reflective surface and an opposing surface and
   (b) silica aerogel granules located between at least the first and second thermally reflective layers, the granules having a diameter of about 50–500 μm and covering less than about 50% of the surface area of each of at least the first and second thermally reflective layers.

2. The insulating composite of claim 1, wherein the reflective surface of said second thermally reflective layer is adjacent to said silica aerogel granules.

3. The insulating composite of claim 2, wherein said silica aerogel granules are adhered to the opposing surface of said first thermally reflective layer.

4. The insulating composite of claim 1, wherein said silica aerogel granules are adhered to the reflective surface of said second thermally reflective layer.

5. The insulating composite of claim 2, wherein said silica aerogel granules are adhered to the opposing surface of said first layer and the reflective surface of said second thermally reflective layer.

6. The insulating composite of claim 1, wherein said first and second thermally reflective layers are aluminum foil.

7. The insulating composite of claim 1, wherein said silica aerogel granules cover at least about 20% of the surface area of the opposing surface of said first thermally reflective layer.

8. The insulating composite of claim 7, wherein said silica aerogel granules cover at least about 10% of the surface area of the opposing surface of said first thermally reflective layer.

9. The insulating composite of claim 1, wherein said silica aerogel granules have a density of about 0.1 g/cm$^3$ or less.

10. The insulating composite of claim 1, further comprising an inorganic binder.

11. An insulating element comprising an air-impermeable container and the insulating composite of claim 1 disposed therein.

12. The insulating element of claim 11, wherein the pressure within said container is about 10 kPa or less.

13. The insulating element of claim 12, wherein the pressure within said container is about 0.1 kPa or less.

14. The insulating element of claim 13, wherein the pressure within said container is about 10$^{-3}$ kPa or less.

15. The insulating element of claim 11, further comprising one or more additional thermally reflective layers separated from each other by a layer of silica aerogel granules.

* * * * *